US010573102B2

(12) United States Patent
Mito et al.

(10) Patent No.: US 10,573,102 B2
(45) Date of Patent: Feb. 25, 2020

(54) FUEL MAINTENANCE GUIDE SYSTEM IN HYBRID VEHICLE

(71) Applicant: MITSUBISHI JIDOSHA KOGYO KABUSHIKI KAISHA, Tokyo (JP)

(72) Inventors: Hideki Mito, Tokyo (JP); Naoki Miyamoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 73 days.

(21) Appl. No.: 15/892,810

(22) Filed: Feb. 9, 2018

(65) Prior Publication Data

US 2018/0232965 A1    Aug. 16, 2018

(30) Foreign Application Priority Data

Feb. 10, 2017   (JP) .................................. 2017-022942
Sep. 11, 2017   (JP) .................................. 2017-173716
Dec. 8, 2017    (JP) .................................. 2017-236159

(51) Int. Cl.
*G07C 5/08*          (2006.01)
*B60W 20/00*         (2016.01)
(Continued)

(52) U.S. Cl.
CPC ........... *G07C 5/0825* (2013.01); *B60W 10/06* (2013.01); *B60W 20/00* (2013.01); *B60W 20/18* (2016.01); *B60W 50/0097* (2013.01); *B60W 50/14* (2013.01); *B60W 2050/146* (2013.01); *B60W 2530/14* (2013.01); *B60W 2560/02* (2013.01);
(Continued)

(58) Field of Classification Search
CPC .................................. G07C 5/08; B60W 20/18
See application file for complete search history.

(56) References Cited

U.S. PATENT DOCUMENTS 7,678,014 B2 *  3/2010  Nohara .................. B60K 6/445
                                                    477/15
2008/0258474 A1 * 10/2008  Tabata .................. B60K 6/365
                                                    290/40 A
(Continued)

FOREIGN PATENT DOCUMENTS

JP   2008-149972 A   7/2008
JP   2010-18128 A    1/2010
(Continued)

OTHER PUBLICATIONS

Extended European Search Report issued Apr. 23, 2018 in the corresponding EP Patent Application No. 18155946.9.

*Primary Examiner* — Alex C Dunn
(74) *Attorney, Agent, or Firm* — Birch, Stewart, Kolasch & Birch, LLP (57) ABSTRACT

A fuel maintenance guide system is provided in a hybrid vehicle in which a shift to a fuel maintenance mode prioritizing consumption of fuel is automatically performed under a predetermined condition regardless of a driver's intention. The fuel maintenance guide system includes an information notification unit configured to perform notification of information urging consumption of the fuel, and a control unit configured to estimate a time to shift automatically to the fuel maintenance mode and to begin to perform notifying actuation of the information notification unit a predetermined period of time before the estimated time.

16 Claims, 5 Drawing Sheets

(51) Int. Cl.
　　　　*B60W 50/14*　　　　(2020.01)
　　　　*B60W 50/00*　　　　(2006.01)
　　　　*B60W 20/18*　　　　(2016.01)
　　　　*B60W 10/06*　　　　(2006.01)

(52) U.S. Cl.
　　　CPC ...... *B60W 2560/04* (2013.01); *B60Y 2200/92* (2013.01); *Y10S 903/903* (2013.01)

(56) References Cited

U.S. PATENT DOCUMENTS

| | | | |
|---|---|---|---|
| 2008/0261770 A1* | 10/2008 | Tabata | B60K 6/40 477/5 |
| 2011/0124389 A1* | 5/2011 | Lee | B60K 35/00 463/9 |
| 2012/0296532 A1* | 11/2012 | Murakami | F02D 31/001 701/50 |
| 2013/0103238 A1* | 4/2013 | Yu | G06F 17/00 701/22 |
| 2017/0088124 A1* | 3/2017 | Amin | G07C 5/0808 |
| 2018/0209358 A1* | 7/2018 | Suzuki | B60W 20/50 |

FOREIGN PATENT DOCUMENTS

| | | |
|---|---|---|
| JP | 2014-91467 A | 5/2014 |
| JP | 2016-88131 A | 5/2016 |
| WO | WO 2012/038790 A1 | 3/2012 |

* cited by examiner

FUEL MAINTENANCE GUIDE SYSTEM IN HYBRID VEHICLE

BACKGROUND OF THE INVENTION

Field of the Invention

The present invention relates to a fuel maintenance guide system in a hybrid vehicle.

Description of the Related Art

Hybrid vehicles are known that travel using a combination of an internal combustion engine and an electric motor (or a motor). In recent years, the hybrid vehicles have been able to travel an increasingly longer distance using the motor as main motive power as a result of improved performance of rechargeable batteries serving as a source of power for the motor and technological development of a plug-in hybrid system or the like that enables the rechargeable battery to be charged by an external commercial power supply.

Particularly for plug-in hybrid vehicles, several modes are used including an EV mode in which drive wheels are driven using a motor, a series mode in which not only is the motor used as a source of motive power but the engine is also used as a generator, and a parallel mode in which both the engine and the motor are used as a driving source. Particularly in low-speed traveling in an urban area and the like, the EV mode is mostly selected in order to reduce fuel consumption. As is known, fuel used by the engine in this case is carried in a vehicle, but when a long time elapses with the fuel remaining in the vehicle, deterioration of the fuel or the like may occur. The deteriorated fuel may degrade the performance of the vehicle such as an output from the engine, fuel economy, and emission control.

Thus, a technique for preventing unused fuel from being deteriorated is known. In the technique, when a predetermined period of time has elapsed since the last supply of fuel, the vehicle is forcibly switched to a fuel maintenance mode in which the engine is actuated to drive the vehicle to promote consumption of the fuel even in a low-speed region where the EV mode, which uses only the motor, is otherwise selected, for example, as disclosed in Japanese Patent Laid-Open No. 2016-88131.

However, a driver is inhibited from selecting the EV mode even when, in the case of driving in an urban area or into the garage, the driver desires to travel silently with the engine stopped. This may lead to degraded convenience.

Furthermore, as is known, a requirement for canceling the fuel maintenance mode is that the supply of at least a predetermined amount of fuel is set. In that case, the driver may supply at least the predetermined amount of fuel to the vehicle if the driver desires to cancel the fuel maintenance mode. However, when the vehicle is shifted to the fuel maintenance mode with a large amount of unused fuel, the amount of fuel that can be supplied may not be equal to or larger than the predetermined amount for the requirement for canceling the fuel maintenance mode. In such a case, the driver needs to actuate the engine to consume the fuel until the predetermined amount of fuel is allowed to be supplied, resulting in the driver's uncomfortable feeling.

SUMMARY OF THE INVENTION

The present invention has been made based on the above-described problems. An object of the present invention is to provide a fuel maintenance guide system in a hybrid vehicle that preliminarily notify a driver of information urging consumption of fuel before a fuel maintenance mode is entered.

An aspect of the present invention provides a fuel maintenance guide system in a hybrid vehicle in which a shift to a fuel maintenance mode prioritizing consumption of fuel is automatically performed under a predetermined condition regardless of a driver's intention. The fuel maintenance guide system has an information notification unit configured to perform notification of information urging consumption of the fuel, and a control unit configured to estimate a time to shift automatically to the fuel maintenance mode and to begin to perform notifying actuation of the information notification unit a predetermined period of time before the estimated time.

According to the aspect of the present invention, in the above-described hybrid vehicle, the information urging consumption of the fuel is provided the predetermined period of time before the fuel maintenance mode is entered, allowing the fuel to be systematically consumed before a shift to the fuel maintenance mode. Thus, it is possible to provide a fuel maintenance guide system which can efficiently avoid a shift to the fuel maintenance mode, or facilitate cancellation of the fuel maintenance mode.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

As an embodiment of the present invention, a hybrid vehicle 500 with a fuel maintenance guide system 100 mounted therein will be described below. Specifically, a case where the fuel maintenance guide system is mounted in a plug-in hybrid system will be described, but the present invention is not limited to such a configuration. Description of components and functions of a vehicle that are not directly related to the present invention is omitted as needed.

Figure 1:
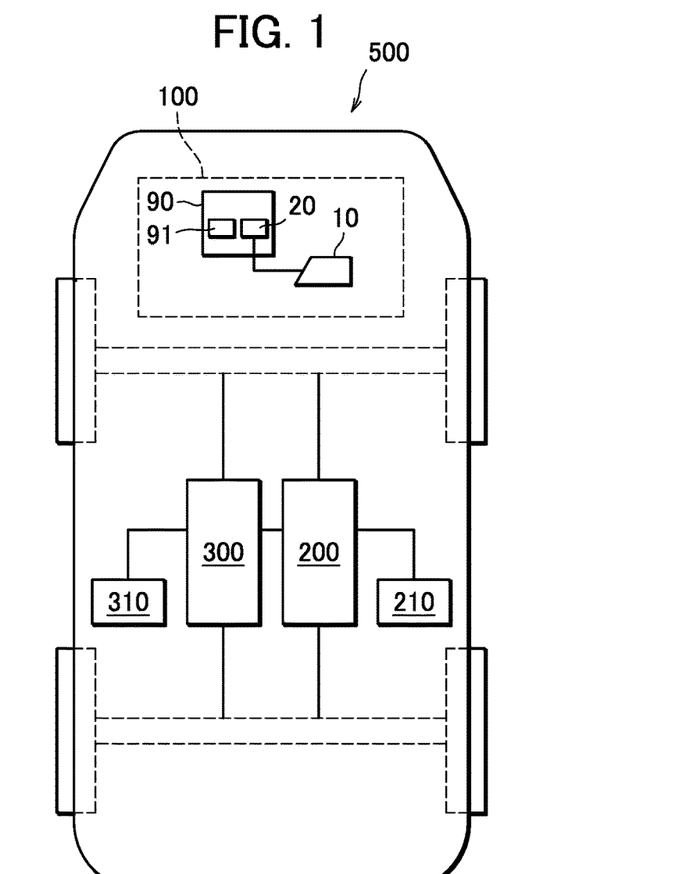
FIG. 1 is a diagram illustrating an example of a vehicle as an embodiment of the present invention.

As illustrated in FIG. 1, the vehicle 500 has an engine 200 that is an internal combustion engine, a motor 300 that is an electric motor, a fuel tank 210 in which fuel for the engine 200 is stored, and a driving battery 310 configured to supply power to the motor 300. Like the vehicle in Japanese Patent Laid-Open No. 2016-88131, the vehicle 500 has an EV mode in which wheels are driven using an output from the motor 300 driven using only power from the battery 310, a parallel mode in which the wheels are driven using the output from the motor 300 and an output from the engine 200 in parallel, and a series mode in which the wheels are driven using the output from the motor 300 driven using power generated by the engine 200. The vehicle 500 further has a fuel maintenance mode in which the engine 200 is forcibly operated when a predetermined period of time has elapsed since supply of fuel, to prevent deterioration of the fuel in the fuel tank 210. That is, in the fuel maintenance mode, the vehicle 500 can be operated in the parallel mode or the series mode depending on a traveling state of the vehicle.

The vehicle 500 has a display unit 10 configured to display various states of the vehicle 500 to a driver to serve as an information notification unit, and a control unit 90 configured to control the fuel maintenance guide system 100. The control unit 90 has a days-until-shift calculation unit 91 serving as an estimation unit to estimate a period of time until a shift to the fuel maintenance mode for preventing deterioration of the fuel, and a preliminary-notification control unit 20 that causes the display unit 10 to begin to provide display for urging consumption of the fuel, on a day a predetermined period of time before a fuel maintenance mode beginning date (mode shift day) estimated by the days-until-shift calculation unit 91. The days-until-shift calculation unit 91 calculates the period of time until a shift to the fuel maintenance mode, based on information from fueling history recording unit 92 that records the amount of fuel fed into the fuel tank 210 and fueling dates. The control unit 90 causes the vehicle 500 to shift automatically to the fuel maintenance mode via an operation mode switching unit not illustrated in the drawings under the condition that it has passed the fuel maintenance mode beginning date estimated by the days-until-shift calculation unit 91. The days-until-shift calculation unit 91, for example, estimates a fuel maintenance mode beginning date to be a day three months after supply of at least a predetermined amount of fuel. The fuel maintenance mode beginning date is not limited to the day three months after the fueling.

The fuel maintenance mode refers to, for example, a mode in which the vehicle 500 is operated in the series mode or the parallel mode using the engine 200 in order to prevent degradation of the fuel, even under driving conditions where the motor 300 is otherwise driven to operate the vehicle 500 as an electric vehicle (EV mode). Specifically, the fuel maintenance mode refers to a state where the vehicle is forcibly driven using the engine 200 even in a low-speed region. The fuel maintenance mode is intended to prevent deterioration of the fuel and is thus desirably canceled under the condition that an amount of fuel has been supplied after consumption, the amount corresponding to at least a predetermined rate of the capacity of the fuel tank 210. For example, in the present embodiment, the fuel maintenance mode is canceled under the condition that at least a predetermined amount (for example, 15 L) of fuel is fed into the fuel tank 210. The present invention is not limited to such a rate, and the fuel maintenance mode may be canceled under the condition that a necessary and sufficient amount of fuel to prevent deterioration of the fuel has been supplied. The predetermined amount is hereinafter referred to as a canceling supply amount.

Figure 2:
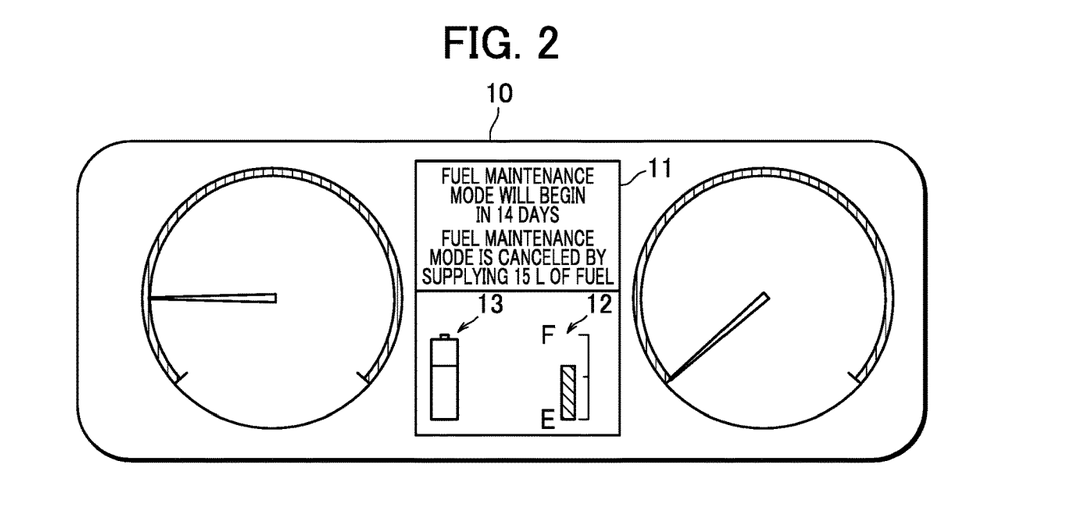
FIG. 2 is a diagram illustrating an example of a configuration of a display unit illustrated in FIG. 1.

As illustrated in FIG. 2, the display unit 10 is a display configured to display the various states of the vehicle 500 to the driver, who is a user of the vehicle 500. The display unit 10 has a state display unit 11 that can display information relating to the fuel maintenance mode, a fuel remaining amount display unit 12 configured to display the remaining amount of fuel in the fuel tank 210, and a power remaining amount display unit 13 configured to display the remaining amount of power in the driving battery 310.

Under the condition that a canceling supply amount of fuel as described above has been fed into the fuel tank 210, the days-until-shift calculation unit 91 sets a reference date A corresponding to a day when a canceling supply amount of fuel as described above was supplied as illustrated in FIG. 3. The days-until-shift calculation unit 91 calculates a scheduled date B corresponding to the fuel maintenance mode shift beginning date when the vehicle 500 is set to the fuel maintenance mode the day, to be a day three months after the reference date A. In the present embodiment, by way of example, a period of time until deterioration of the fuel begins to be expected to occur is estimated to be six months after the reference date A, and the scheduled date B when the fuel maintenance mode is forcibly begun is determined to be the day three months after the reference date A. However, the present invention is not limited to these periods of time. The days-until-shift calculation unit 91 functions as an estimation unit that estimates the time when a shift to the fuel maintenance mode for preventing deterioration of the fuel is performed, using, as a reference, time when at least a canceling supply amount of fuel as described above was fed into the fuel tank 210, based on the information from the fueling history recording unit 92. Furthermore, in the present embodiment, the days-until-shift calculation unit 91 calculates the number of days. However, any predetermined period of time may be calculated, and no limitation is imposed on the expression of the predetermined period of time. For example, the number of days, the number of hours, or the number of months may be calculated.

When the scheduled date B is calculated, the preliminary-notification control unit 20 causes the display unit 10 to begin to indicate that a shift to the fuel maintenance mode will be performed, on a day a predetermined period of time C before the scheduled date B. In other words, the preliminary-notification control unit 20 causes the display unit 10 serving as an information notification unit to perform notifying actuation. The preliminary-notification control unit 20, for example, displays "Fuel maintenance mode will begin in 14 days" on the state display unit 11 of the display unit 10 as shown in FIG. 2. In such a configuration, the preliminary-notification control unit 20 functions as a notification information generation unit that generates information allowing the driver to be notified of information on the vehicle 500.

Figure 3:
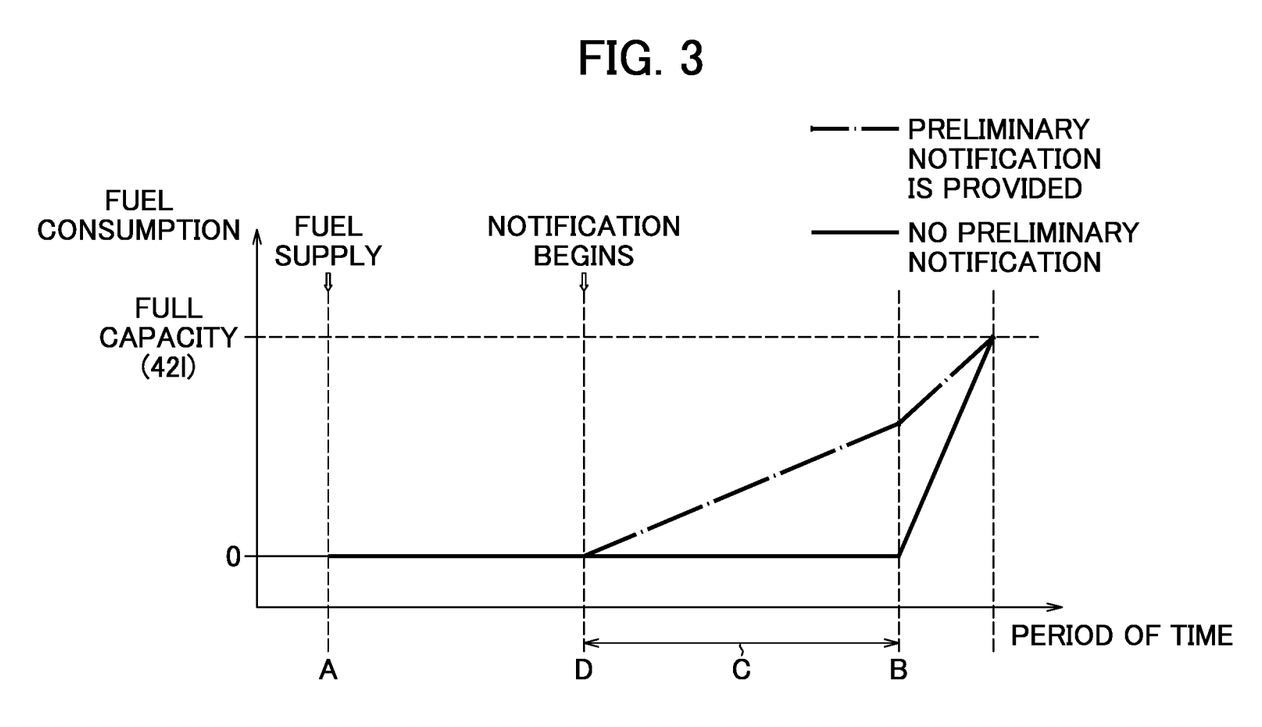
FIG. 3 is a diagram illustrating an example of change in fuel consumption of the vehicle.

When the preliminary-notification control unit 20 causes the display unit 10 to display information based on the scheduled date B when the vehicle 500 enters the fuel maintenance state, thus notifying the driver of the information, the driver can cause the fuel to be systematically consumed by driving the vehicle 500 by the positive use of the engine 200 (by selecting one of the series mode, the parallel mode, a battery charge mode based on engine power generation, and the like) before the fuel maintenance mode is entered, for example, as illustrated by an alternate long and short dash line in FIG. 3.

The operating state of the vehicle 500 is varied based on the driver's intention to allow utilization of hybrid traveling or suitable storage of the motive power of the engine 200 in the driving battery 310 as a quantity of electricity, thus enabling the fuel to be effectively consumed. Consequently, the remaining amount of fuel in the fuel tank decreases before the fuel maintenance mode is entered, facilitating the supply of at least a predetermined amount of fuel.

Figure 4:
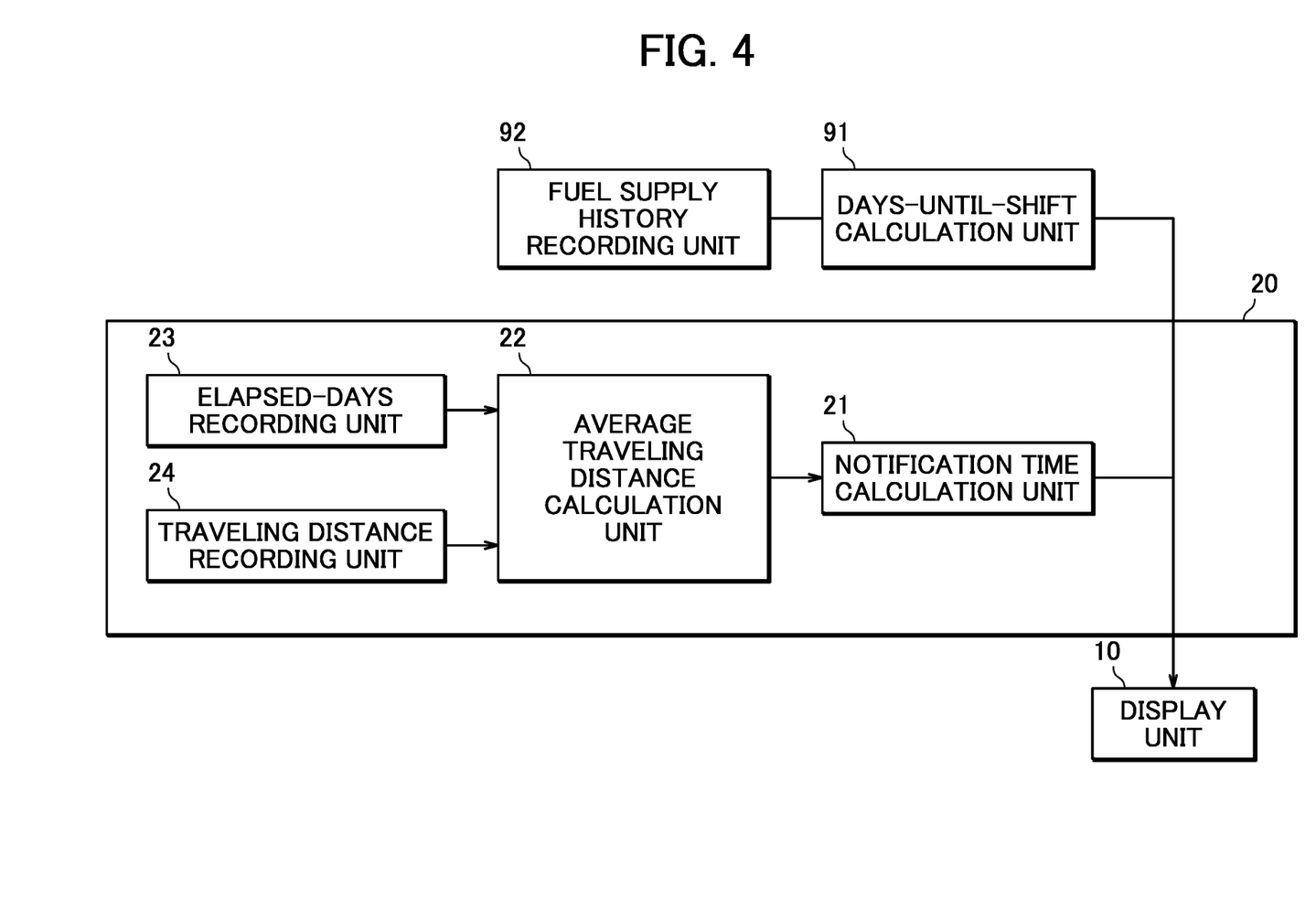
FIG. 4 is a block diagram illustrating an example of a functional configuration of a fuel maintenance guide system.

A method for the preliminary notification will be described. As illustrated in FIG. 4, the preliminary-notification control unit 20 includes a notification time calculation unit 21 configured to calculate a notification beginning date D corresponding to a day a predetermined period of time C before the scheduled date B. The preliminary-notification control unit 20 has an average traveling distance calculation unit 22 configured to calculate an average value of the distance that the vehicle 500 travels per day, an elapsed-days recording unit 23 that records the number of days having elapsed since the last starting of the vehicle 500, and a traveling distance recording unit 24 that records the traveling distance.

Control performed by the control unit 90 of the fuel maintenance guide system configured as described above will be described using a flowchart in FIG. 5. The control unit 90 includes an I/O apparatus, a processor (central processing unit), and a storage apparatus (ROM, RAM, or the like) used to store a control program, though these components are not illustrated in the drawings. The storage apparatus in the control unit 90 stores commands causing the processor to execute processing in accordance with the flowchart in FIG. 5.

Figure 5:
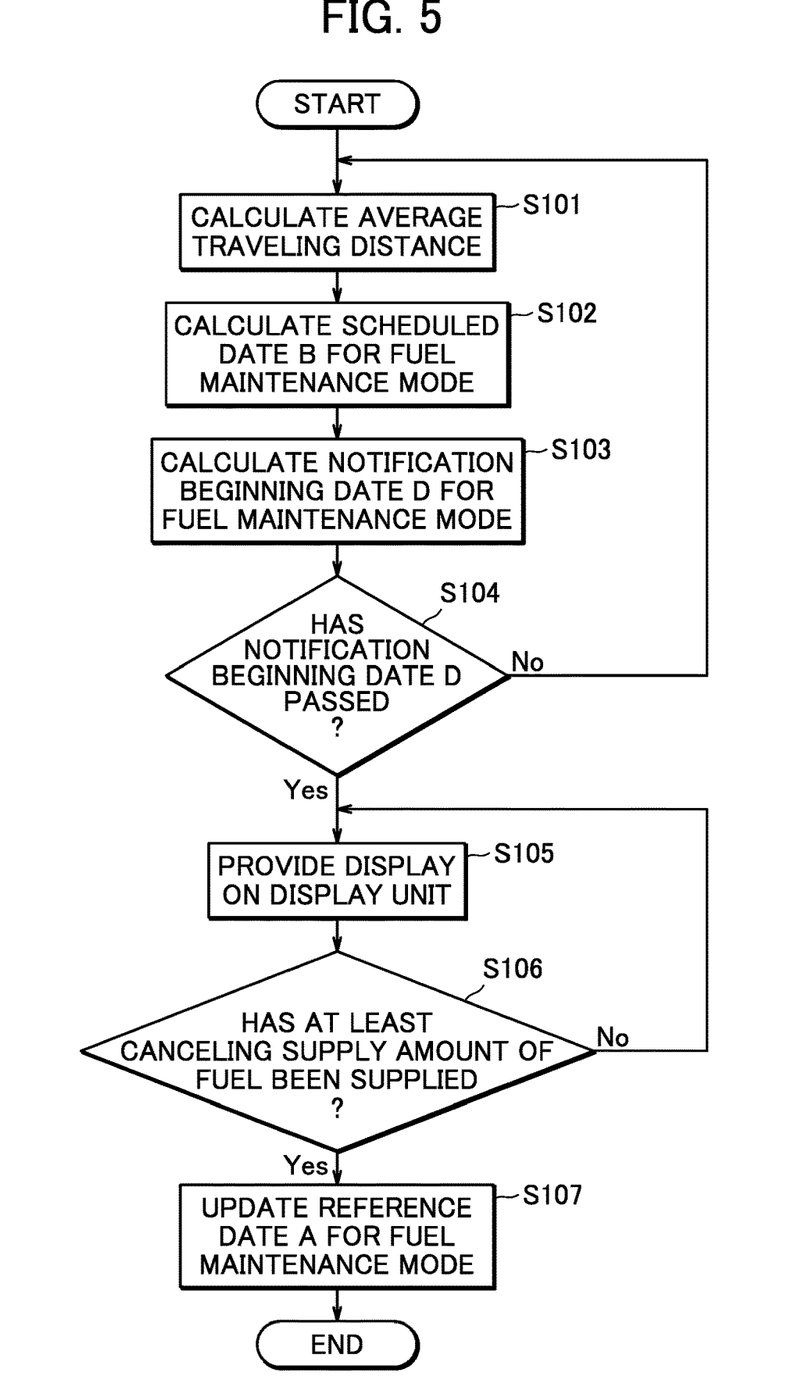
FIG. 5 is a flow diagram illustrating an example of operations of a preliminary-notification control unit.

First, when the vehicle 500 is started, the average traveling distance calculation unit 22 calculates an average traveling distance based on the traveling distance and the number of days recorded by the traveling distance recording unit 24 and the elapsed-days recording unit 23 (step S101). Then, the days-until-shift calculation unit 91 calculates the scheduled date B when the fuel maintenance mode is entered, using the reference date A corresponding to the last feeding of at least a canceling supply amount of fuel as described above into the fuel tank 210 (step S102). The notification time calculation unit 21 calculates the notification beginning date D based on a calculation formula described below using the average traveling distance determined by the average traveling distance calculation unit 22 in step S101 (step S103).

The preliminary-notification control unit 20 is intended to promote consumption of the fuel by the preferential use of the engine 200 based on the driver's determination, for example, when the driver desires to consume the fuel before the vehicle 500 enters the fuel maintenance mode. That is, the predetermined period of time C until the scheduled date B from the notification beginning date D is desirably a sufficient period of time to allow a necessary and sufficient amount of fuel to be consumed under the driving conditions.

Figure 6:
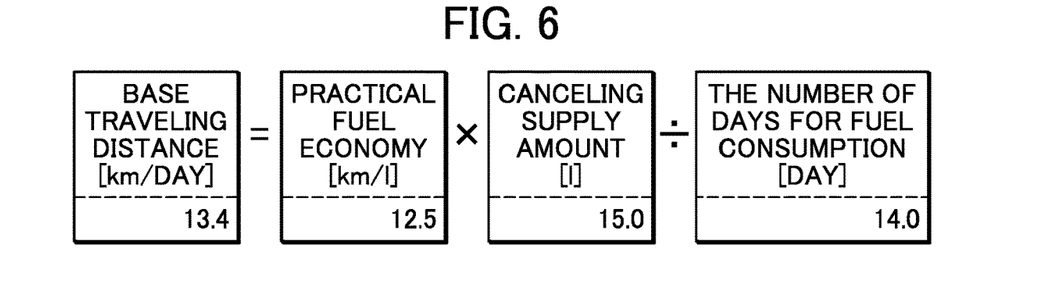
FIG. 6 is a diagram illustrating an example of a calculation method for a base traveling distance.

Specifically, it is most desirable to set the amount of fuel consumed during the predetermined period of time C when the driver operates the vehicle at a pace based on the ordinary traveling distance while actuating the engine, to 15 L or more, which corresponds to the condition under which the fuel maintenance mode is canceled. Of course, this numerical value varies according to the driver's ordinary traveling distance per day, the practical fuel economy of the vehicle 500, and the like. However, in regard to the number of days when the fuel is to be consumed, the notification may begin at least approximately two weeks before the scheduled date B under typical traveling conditions. Thus, in the present embodiment, by way of example, the traveling distance per date, which serves as a base, is calculated to be 13.4 km/day in accordance with the calculation formula shown in FIG. 6 based on the practical fuel economy (12.5 km/L), the canceling supply amount (15 L), and the number of days when the fuel is to be consumed (14 days).

In the present embodiment, the number of days for the preliminary notification is adjusted by determining a difference between the average traveling distance of the vehicle 500 and the base traveling distance serving as a reference and based on the assumption that a canceling supply amount of fuel is to be consumed in two weeks, and multiplying the difference by 2.3 days, which correspond to the number of days for the notification increased or reduced per difference of 1 km (the number of days needed for fuel consumption per average traveling distance of 1 km per month=31 days/13.4 km). Here, the number of days for the notification increased or reduced per difference of 1 km is not limited to the above-described numerical value but may be appropriately set according to the driver's traveling distance.

Specifically, when the average traveling distance of the vehicle 500 is 10 km/day, the predetermined period of time C is calculated to be (13.4−10)×2.3+14=21.9 days, and thus, the notification beginning date D is calculated to be a day 21.9 days before the scheduled date B.

Particularly if the driver ordinarily drives a long distance, a simple increase or reduction according to the difference from the base traveling distance may significantly reduce the predetermined period of time C, resulting in the notification beginning date D corresponding to the day before the scheduled date B or the scheduled date B. To prevent such a situation, the minimum number of days for the preliminary notification (lower limit value) is set to two weeks (14 days) according to the present embodiment. That is, the predetermined period of time C is not set shorter than the minimum number of days for the preliminary notification, which corresponds to the lower limit value. The minimum number of days for the preliminary notification may be freely changed by the driver's setting. Alternatively, the driver may preset the predetermined period of time C.

Now, another example of calculation will be described. When the actual fuel economy is 12.5 km/L, traveling a distance of 12.5 km/L×15 L=187.5 km is needed in order to consume a canceling supply amount of 15 L. Then, when the average traveling distance per day is, for example, 20 km, 187.5 km 20 km=9.38 days, and the notification beginning date D is calculated to be a day 9.38 days before the scheduled date B.

The control will further be described with reference back to the flowchart in FIG. 5. When the notification time calculation unit 21 sets the notification beginning date D in step S103, the preliminary-notification control unit 20 compares the number of days having elapsed since the reference date A with the notification beginning date D (step S104). If the notification beginning date D has not been reached yet in step S104, the process returns to step S101 to continue processing. If the notification beginning date D has passed in step S104, the preliminary-notification control unit 20 causes the display unit 10 to display the number of days until a shift to the fuel maintenance mode (displays the predetermined period of time C on the first day of the period of the display) (step S105). The display unit 10 may display the amount of fuel that needs to be supplied in order to avoid shifting to the fuel maintenance mode while simultaneously displaying the number of days until a shift to the fuel maintenance mode.

After the display of the number of days in step S105, the control unit 90 determines whether 15 L or more of fuel, which corresponds to the canceling supply amount for the fuel maintenance mode, has been fed into the fuel tank 210, that is, whether the fuel maintenance mode has been canceled (step S106). This determination is made based on the information from the fueling history recording unit 92. If, in step S106, the fuel maintenance mode is determined to have been canceled, the reference date A is updated and the process returns to step S101 (step S107). When 15 L or more of fuel, which corresponds to the canceling supply amount, has not been supplied by the scheduled date B in step S106, the vehicle 500 automatically shifts to the fuel maintenance mode. In that case, neither the reference date A nor the scheduled date B is changed, and thus, the process returns to step S105 to continue processing, and the fuel maintenance mode lasts until 15 L or more of fuel is supplied.

Figure 7:
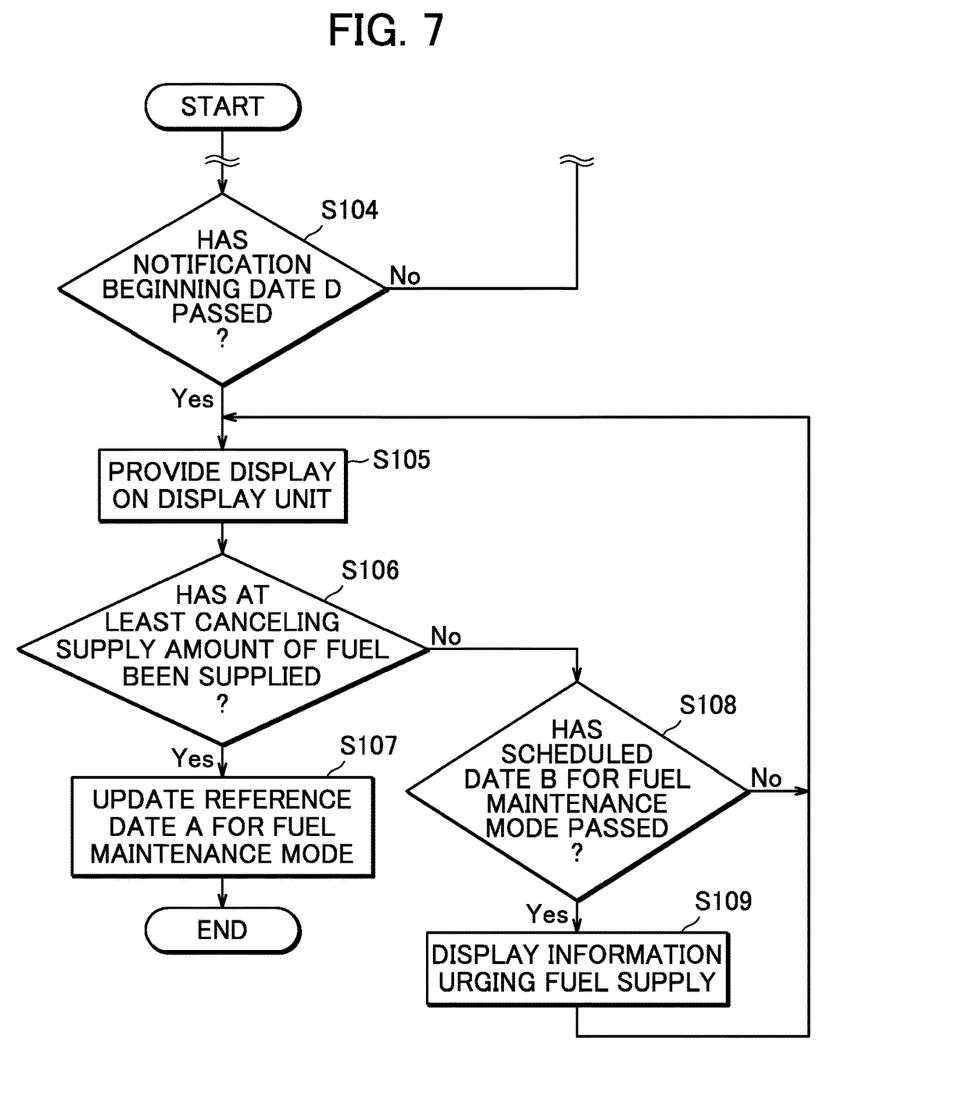
FIG. 7 is a flow diagram illustrating a variation of operations of the preliminary-notification control unit illustrated in FIG. 5.

When the vehicle 500 thus shifts to the fuel maintenance mode, processing as illustrated as a variation in FIG. 7 may be executed in order particularly to attract the driver's attention. That is, when a canceling supply amount of fuel as described above has not been supplied in step S106, the preliminary-notification control unit 20 determines whether the scheduled date B for the fuel maintenance mode has passed (step S108). In a case of determining in step S108 that the scheduled date B for the fuel maintenance mode has passed, the preliminary-notification control unit 20 switches the display on the display unit 10 from the number of days until a shift to the fuel maintenance mode and the amount of fuel that needs to be supplied in order to avoid shifting to the fuel maintenance mode, to information indicating that the fuel maintenance mode has begun or information urging fuel supply (step S109).

Specifically, for example, the display is switched to a message "Fuel maintenance mode has begun. Fuel maintenance mode is canceled by supplying 15 L or more of fuel at once." Here, only the simple message is displayed. However, the present invention is not limited to such a display method; the display of the message and the amount of fuel supplied can be emphasized to attract more attention from the driver by blinking the display or increasing the size of the characters.

Like the flowchart illustrated in FIG. 5, a flowchart illustrated in FIG. 7 has steps S101, S102, and S103 before step S104, which are not illustrated in FIG. 7.

In the present embodiment, the vehicle 500 has the display unit 10 configured to provide an indication urging consumption of the fuel, the days-until-shift calculation unit 91 that estimates the period of time until a shift to the fuel maintenance mode for preventing deterioration of the fuel, based on the reference date A corresponding to the time when the fuel was supplied to the vehicle 500, and the preliminary-notification control unit 20 that causes the display unit 10 to display the information on the number of days until the time estimated by the days-until-shift calculation unit 91. This configuration allows the driver to change a driving state in such a manner as to cause the vehicle 500 to consume the fuel before a shift to the fuel maintenance mode, thus facilitating avoidance of a shift to the fuel maintenance mode that is irrelevant to the driver's determination.

In the present embodiment, the preliminary-notification control unit 20 of the vehicle 500 has the notification time calculation unit 21 configured to calculate the predetermined period of time C for the preliminary display. This configuration allows the driver to change the driving state in such a manner as to cause the vehicle 500 to begin to consume the fuel the predetermined period of time C before the vehicle 500 shifts to the fuel maintenance mode, resulting in improved convenience.

In the present embodiment, the vehicle 500 has the average traveling distance calculation unit 22 that calculates the average traveling distance of the vehicle 500, and the notification time calculation unit 21 calculates the predetermined period of time C using the average traveling distance. This configuration allows the driver to change the driving state in such a manner as to cause the vehicle 500 to begin to consume the fuel the predetermined period of time C before the vehicle 500 shifts to the fuel maintenance mode, and allows the predetermined period of time C to be calculated based on the average traveling distance during the driver's ordinary driving. Thus, an automatic shift to the fuel maintenance mode is easily avoided based on the systematic change in the driving state.

In the present embodiment, the notification time calculation unit 21 calculates the predetermined period of time C based on the predetermined settings such as the practical fuel economy and the canceling supply amount of the vehicle 500. This configuration enables the predetermined period of time C to be appropriately set according to the type of the vehicle 500 and the like, allowing the scheduled date B and the notification beginning date D to be calculated in a more practical manner. Therefore, an automatic shift to the fuel maintenance mode is easily avoided based on the systematic change in the driving state.

In the present embodiment, the predetermined period of time C can be varied by the driver's setting. This configuration enables changes tailored to the driver's manner of driving and preferences, allowing the driver to be notified of the information at a timing when the driver does not feel uncomfortable. This facilitates avoidance of a shift to the fuel maintenance mode. The driver's setting as used herein may be, for example, manual operations of switches or the like, or changes in the settings through operation of a touch panel of the display unit 10.

The preferred embodiment of the present invention has been described, but the present invention is not limited to such a particular embodiment. Unless otherwise specified in the description, many variations and modifications may be made to the embodiment without departing from the spirits of the present invention recited in the claims. For example, in the present embodiment, the display unit indicates the number of days. However, the display unit may indicate the number of hours, and is also not limited to the display of characters but may display a graph or a warning light. The information notification urging fuel consumption is not limited to the visual display but may be vocal. Furthermore, in the present embodiment, the fuel maintenance guide system is provided as a function of the control unit. However, the present invention is not limited to this configuration, and the system controlling the vehicle may itself have the fuel maintenance guide system. Alternatively, a facility outside the vehicle may notify the display unit of information, or information may be provided to the facility outside of the vehicle, which then notifies a display unit of an information terminal or the like of the information.

The effects described in the embodiment of the present invention are only enumeration of the most suitable effects produced by the most suitable configuration resulting from the present invention. The configuration according to the present invention is not limited to the configuration described in the embodiment of the present invention.

The invention claimed is:

1. A fuel maintenance guide system in a hybrid vehicle in which a shift to a fuel maintenance mode prioritizing consumption of fuel is automatically performed under a predetermined condition regardless of a driver's intention, the fuel maintenance guide system comprising:
   an information notification unit configured to perform notification of information urging consumption of the fuel; and
   a control unit configured to estimate a time until a driving mode is shifted automatically to the fuel maintenance mode and to begin to display the estimated time a predetermined period of time before the mode is automatically shifted to the fuel maintenance mode.

2. The fuel maintenance guide system in the hybrid vehicle according to claim 1, wherein the control unit calculates the predetermined period of time using an average traveling distance of the vehicle.

3. The fuel maintenance guide system in the hybrid vehicle according to claim 1, wherein the control unit calculates the predetermined period of time based on fuel economy of the vehicle.

4. The fuel maintenance guide system in the hybrid vehicle according to claim 1, wherein the predetermined period of time is variable according to a user's setting.

5. The fuel maintenance guide system in the hybrid vehicle according to claim 1, wherein the predetermined period of time is not set shorter than a predetermined lower limit value.

6. The fuel maintenance guide system in the hybrid vehicle according to claim 1, wherein the information notification unit displays a number of days until a shift to the fuel maintenance mode.

7. The fuel maintenance guide system in the hybrid vehicle according to claim 6, wherein the information notification unit displays an amount of fuel that needs to be supplied to avoid a shift to the fuel maintenance mode.

8. The fuel maintenance guide system in the hybrid vehicle according to claim 7, wherein the notifying actuation of the information notification unit is canceled by supplying at least a predetermined amount of fuel.

9. The fuel maintenance guide system in the hybrid vehicle according to claim 6, wherein the notifying actuation of the information notification unit is canceled by supplying at least a predetermined amount of fuel.

10. The fuel maintenance guide system in the hybrid vehicle according to claim 1, wherein the information notification unit displays an amount of fuel that needs to be supplied to avoid a shift to the fuel maintenance mode.

11. The fuel maintenance guide system in the hybrid vehicle according to claim 10, wherein the notifying actuation of the information notification unit is canceled by supplying at least a predetermined amount of fuel.

12. The fuel maintenance guide system in the hybrid vehicle according to claim 1, wherein the notifying actuation of the information notification unit is canceled by supplying at least a predetermined amount of fuel.

13. The fuel maintenance guide system in the hybrid vehicle according to claim 1, wherein the predetermined condition under which a shift to the fuel maintenance mode is performed is set based on a number of days having elapsed since supply of the fuel to the vehicle.

14. The fuel maintenance guide system in the hybrid vehicle according to claim 1, wherein the hybrid vehicle includes a motor driving wheels using power supplied by a battery and an engine driving the wheels or driving a generator using fuel fed from a fuel tank, and has a fuel maintenance mode in which the engine is forcibly operated under a predetermined condition to prevent deterioration and alteration of the fuel in the fuel tank.

15. A fuel maintenance guide system in a hybrid vehicle in which a shift to a fuel maintenance mode prioritizing consumption of fuel is automatically performed under a predetermined condition regardless of a driver's intention, the fuel maintenance guide system comprising:
an information notification unit configured to perform notification of information urging consumption of the fuel; and
a control unit configured to estimate a time to shift automatically to the fuel maintenance mode and to begin to perform notifying actuation of the information notification unit a predetermined period of time before the estimated time;
wherein the information notification unit displays an amount of fuel that needs to be supplied to avoid a shift to the fuel maintenance mode.

16. The fuel maintenance guide system in the hybrid vehicle according to claim 15, wherein the notifying actuation of the information notification unit is canceled by supplying at least a predetermined amount of fuel.

* * * * *